US012238807B2

(12) United States Patent
Fu et al.

(10) Patent No.: US 12,238,807 B2
(45) Date of Patent: Feb. 25, 2025

(54) DRX PARAMETER CONFIGURATION METHOD, PROCESSING METHOD, NETWORK NODE, AND USER EQUIPMENT

(71) Applicant: GUANGDONG OPPO MOBILE TELECOMMUNICATIONS CORP., LTD., Dongguan (CN)

(72) Inventors: Zhe Fu, Dongguan (CN); Yanan Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 407 days.

(21) Appl. No.: 17/838,556

(22) Filed: Jun. 13, 2022

(65) Prior Publication Data

US 2022/0312546 A1 Sep. 29, 2022

Related U.S. Application Data

(63) Continuation of application No. PCT/CN2019/125282, filed on Dec. 13, 2019.

(51) Int. Cl.
*H04W 76/28* (2018.01)
*H04L 1/1812* (2023.01)
(52) U.S. Cl.
CPC ........... *H04W 76/28* (2018.02); *H04L 1/1812* (2013.01)
(58) Field of Classification Search
CPC combination set(s) only.
See application file for complete search history.

(56) References Cited

U.S. PATENT DOCUMENTS

| 2018/0324635 | A1* | 11/2018 | Babaei | H04W 74/006 |
| 2018/0343686 | A1* | 11/2018 | Manepalli | H04W 76/28 |
| 2019/0053159 | A1 | 2/2019 | Wei et al. | |
| 2019/0132857 | A1* | 5/2019 | Babaei | H04W 72/52 |

(Continued)

FOREIGN PATENT DOCUMENTS

| CN | 108307547 A | 7/2018 | |
| WO | WO-2018031327 A1 * | 2/2018 | ........... H04L 5/0037 |

(Continued)

OTHER PUBLICATIONS

International Search Report and Written Opinion dated Sep. 3, 2020 in International Application No. PCT/CN2019/125282. English translation attached.

(Continued)

*Primary Examiner* — Phong La
(74) *Attorney, Agent, or Firm* — Sheppard, Mullin, Richter & Hampton LLP

(57) ABSTRACT

Some embodiments of the present disclosure provide a DRX parameter configuration method, a DRX processing method, a network node, and a user equipment. The DRX parameter configuration method is applied in the network node and includes: determining (101) one or more service types corresponding to a User Equipment (UE) based on the characteristic information of the UE; configuring (102) a DRX parameter for each of the one or more service types; and transmitting (103) the DRX parameter to the UE. With the embodiments of the present disclosure, requirements of data transmission under different application scenes can be met.

14 Claims, 4 Drawing Sheets

(56) References Cited

U.S. PATENT DOCUMENTS

| | | | |
|---|---|---|---|
| 2019/0297577 A1* | 9/2019 | Lin | H04W 52/0229 |
| 2019/0356450 A1* | 11/2019 | He | H04W 72/20 |
| 2020/0045707 A1* | 2/2020 | Hwang | H04W 72/23 |
| 2021/0059006 A1* | 2/2021 | Babaei | H04W 76/28 |
| 2021/0289496 A1* | 9/2021 | Lee | H04W 74/0808 |
| 2021/0410069 A1* | 12/2021 | Jo | H04L 5/0053 |
| 2022/0239415 A1* | 7/2022 | Narayanan Thangaraj | H04L 1/1812 |

FOREIGN PATENT DOCUMENTS

| | | | | |
|---|---|---|---|---|
| WO | 2018059564 A1 | | 4/2018 | |
| WO | WO-2018107498 A1 | * | 6/2018 | H04L 1/1812 |
| WO | WO-2018126408 A1 | * | 7/2018 | H04L 1/1883 |
| WO | 2018232321 A2 | | 12/2018 | |
| WO | WO-2019033071 A1 | * | 2/2019 | H04L 1/0013 |
| WO | WO-2019213883 A1 | * | 11/2019 | |

OTHER PUBLICATIONS

LG Electronics Inc. "Consideration for DRX in NR", 3GPP TSG-RAN2 Meeting NR AH#2, R2-1706750, Jun. 29, 2017 (Jun. 29, 2017), see entire document.

Communication pursuant to Article 94(3) EPC for European application 19955575.6 mailed May 10, 2024, 5 pages.

Extended European Search Report dated Mar. 30, 2023 received in European Patent Application No. EP19955575.6.

* cited by examiner

DRX PARAMETER CONFIGURATION METHOD, PROCESSING METHOD, NETWORK NODE, AND USER EQUIPMENT

CROSS-REFERENCE TO RELATED APPLICATIONS

The present application is a continuation of International Application No. PCT/CN2019/125282 filed on Dec. 13, 2019, the content of which is incorporated herein by reference in its entirety.

FIELD

The present disclosure relates to the field of wireless communications technologies, and more particularly, to a DRX parameter configuration method, a DRX processing method, a network node, and a user equipment.

BACKGROUND

The broadband wireless high-speed data transmission provided by Long Term Evolution (LTE) adopts a 1 ms short frame design, which means that a User Equipment (UE) needs to listen to a Physical Downlink Control CHannel (PDCCH) frame by frame, and thus the UE consumes power rapidly. In the LTE, a DRX mechanism is proposed, which may allow the UE to turn off a radio receiver thereof according to a protocol-specified period so as to save power. Currently, a network node configures a DRX parameter for a UE based on a legacy protocol, and the UE maintains a DRX timer based on the DRX parameter.

The inventor finds that the related art has at least the following problems. There are a plurality of different service scenarios in the 5G, and the Quality of Service (QoS) requirements of data transmission in the different service scenarios are different. For example, data of a Ultra Reliable Low Latency Communications (URLLC) type has a high requirement on Round-Trip Time (RTT), and Enhanced Mobile Broadband (eMBB) has a low requirement on RTT. Currently, the DRX processing is performed based on the DRX parameter configured by the network node, therefore the QoS requirements of data transmission under different application scenarios are difficult to be met simultaneously.

SUMMARY

Some embodiments of the present disclosure aim to provide a DRX parameter configuration method, a DRX processing method, a network node, and a user equipment, which can meet data transmission requirements in different application scenarios.

An embodiment of the present disclosure provides a DRX parameter configuration method. The DRX parameter configuration method is applied in a network node and includes: determining one or more service types corresponding to a User Equipment (UE) based on characteristic information of the UE; configuring a DRX parameter for each of the one or more service types; and transmitting the DRX parameter to the UE.

An embodiment of the present disclosure provides a DRX processing method. The DRX processing method is applied in a User Equipment (UE) connected to a network node, and the network node is a network node in the DRX parameter configuration method described above. The method includes: determining a service type corresponding to a resource; determining, based on the service type corresponding to the resource, a DRX parameter corresponding to the resource from a DRX parameter transmitted by the network node; and maintaining a DRX timer for the resource based on the determined DRX parameter.

An embodiment of the present disclosure provides a network node. The network node includes at least one processor and a memory communicatively connected to the at least one processor. The memory stores instructions executable by the at least one processor. The instructions, when executed by the at least one processor, enable the at least one processor to perform the DRX parameter configuration method described above.

An embodiment of the present disclosure provides a user equipment. The user equipment includes at least one processor and a memory communicatively connected to the at least one processor. The memory stores instructions executable by the at least one processor. The instructions, when executed by the at least one processor, enable the at least one processor to perform the DRX processing method described above.

An embodiment of the present disclosure provides a non-transitory computer-readable storage medium. The non-transitory computer-readable storage medium has a computer program stored thereon. The computer program, when executed by a processor, implements the DRX parameter configuration method described above or the DRX processing method described above.

In the embodiments of the present disclosure, compared with the related art, the network node determines one or more service types corresponding to the UE based on characteristic information of the UE, and configures a DRX parameter for each of the one or more service types. Therefore, for each of resources corresponding to different service types, the UE may use a DRX parameter corresponding to a service type that corresponds to the resource to maintain a DRX timer for the resource. In this way, the data transmitted on each resource can meet the requirement of a corresponding service type as much as possible, that is, requirements of data transmission in different application scenarios can be met.

For example, the characteristic information of the UE includes a mapping relationship between a Logical CHannel (LCH) of the UE and a resource of the UE. The determining the one or more service types corresponding to the UE based on the characteristic information of the UE includes: determining the one or more service types corresponding to the UE based on obtained target information. The target information includes at least one of: attribute information of the resource in the mapping relationship and attribute information of the LCH in the mapping relationship. In this example, specific contents of the characteristic information of the UE are provided.

For example, the determining the one or more service types corresponding to the UE based on the characteristic information of the UE further includes: mapping a resource and an LCH of the UE, which are not in the mapping relationship, to another service type different from the service type reflected by the attribute information of the resource and the attribute information of the LCH in the mapping relationship. The one or more service types corresponding to the UE includes the other service type. In this example, a resource and an LCH that are not in the mapping relationship belong to the other service type, and an independent DRX parameter is set for the resource and the LCH.

For example, the transmitting the DRX parameter to the UE further includes: marking the DRX parameter with a matching object, and transmitting the DRX parameter marked with the matching object to the UE. The matching object of the DRX parameter includes at least one of: the service type corresponding to the DRX parameter, a resource having attribute information reflecting the service type, and an LCH having attribute information reflecting the service type. In this example, when the DRX parameter is transmitted, the LCH, the resource or the service type corresponding to the DRX parameter is assigned at the same time. In this way, the UE can quickly identify a corresponding DRX parameter for maintaining the DRX timer of each resource.

For example, the characteristic information of the UE includes at least one of: capability information of the UE, attribute information of data being transmitted or to be transmitted by the UE, attribute information of a resource of the UE, and the mapping relationship between the LCH of the UE and the resource of the UE. In this example, selectable content of characteristic information of the UE is provided.

For example, the DRX parameter includes a DRX parameter related to a Hybrid Automatic Repeat ReQuest (HARQ) process. In this example, the DRX parameter(s) configured for the one or more service types include a DRX parameter related to the HARQ process. Therefore, fewer DRX parameters are reconfigured and power consumption of the UE can be greatly decreased.

For example, the one or more service types include one or more of: a Ultra Reliable Low Latency Communications (URLLC) type, an Enhanced Mobile BroadBand (eMBB) type, and a common type. The common type has a lower requirement on quality of service than the eMBB type. In this example, selectable categories of the one or more service types are proposed.

BRIEF DESCRIPTION OF DRAWINGS

One or more embodiments are illustrated by way of example in the accompanying drawings corresponding thereto, and the exemplary description thereof is not to be construed as limiting the embodiments. In the drawings, elements having same reference numerals represent similar elements, and the drawings are not to be construed as limiting the scale unless otherwise specified. The following embodiments are divided for convenience of description, and should not constitute any limitation to the specific implementation manner of the present disclosure, and the embodiments may be mutually incorporated and referred to without contradiction.

DESCRIPTION OF EMBODIMENTS

In order to make the objects, technical solutions and advantages of the present disclosure more clearly understood, some embodiments of the present disclosure will be described in detail below with reference to the accompanying drawings and embodiments. It should be understood that the specific embodiments described herein are merely to illustrate the present disclosure, instead of limiting the present disclosure.

In a 3GPP Radio Access Network (RAN) LTE system, a network node may be a combination of an Evolved Universal Terrestrial RAN (E-UTRAN) node B (also commonly denoted as evolved node B, enhanced node B (eNodeB, or eNB)) and a Radio Network Controller (RNC), and may communicate with a wireless device referred to as a User Equipment (UE). For example, the UE may be a terminal device such as a mobile phone. DownLink (DL) transmission may be a communication from a network node (e.g., eNodeB) to a wireless device, and UpLink (UL) transmission may be a communication from a wireless device to a network node.

There are multiple service scenarios in the 5G, for example, URLLC, eMBB, and massive Machine Type Communications (mMTC). The service types of data transmitted under different service scenarios are different. Generally, the service types of data transmitted by the UE include a URLLC type and an eMBB type.

Figure 1:
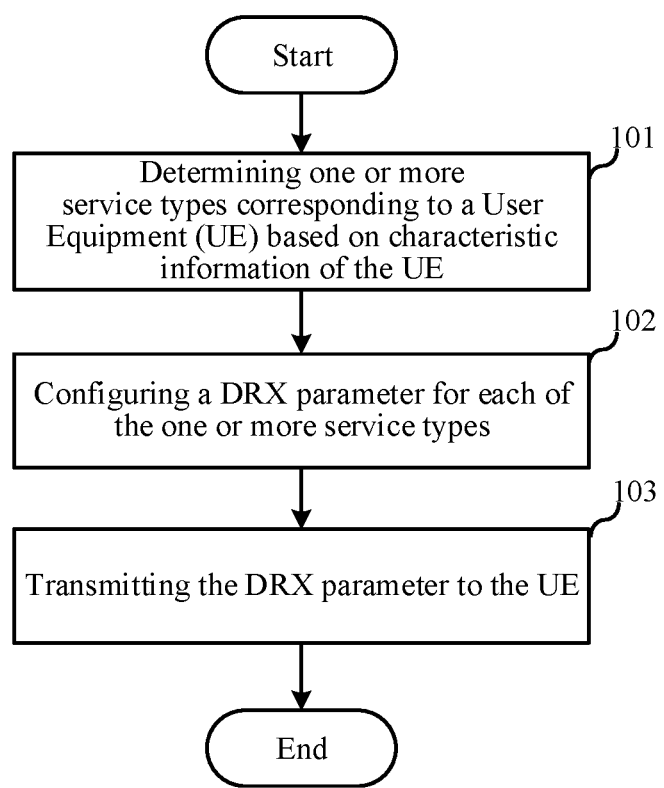
FIG. 1 is a flowchart of a DRX parameter configuration method according to a first embodiment of the present disclosure.

A first embodiment of the present disclosure relates to a DRX parameter configuration method. As illustrated in FIG. 1, the DRX parameter configuration method includes the following steps.

At Step 101, one or more service types corresponding to a User Equipment (UE) are determined based on characteristic information of the UE.

At Step 102, a DRX parameter is configured for each of the one or more service types.

At Step 103, the DRX parameter is transmitted to the UE.

A network node may configure a DRX parameter for a UE based on a request from the UE. For example, the UE may transmit a DRX parameter configuration request when accessing a network, periodically transmit the DRX parameter configuration request, or transmit the DRX parameter configuration request when detecting that a service type of data being transmitted or to be transmitted by the UE changes. The DRX parameter configuration request transmitted by the UE may include characteristic information of the UE. Alternatively, the DRX parameter configuration request and the characteristic information of the UE may be transmitted to the network node as independent messages.

Alternatively, the network node may configure a DRX parameter for the UE and transmit it to the UE independently of the request from the UE. That is, the network node may automatically or actively configure a DRX parameter for the UE. For example, the network node may configure a DRX parameter for the UE when receiving capability information reported by the UE, configure a DRX parameter for the UE when configuring a mapping relationship between a Logical CHannel (LCH) and a resource for the UE, or configure a DRX parameter for the UE when detecting that a service type of data being transmitted or to be transmitted by the UE changes. The resource described in this embodiment refers to a UL and/or DL resource.

In this embodiment, the characteristic information of the UE may include at least one of: capability information of the UE, attribute information of data being transmitted or to be transmitted by the UE, attribute information of a resource, a mapping relationship between an LCH and a service, and a mapping relationship between the LCH and the resource. The attribute information of the data being transmitted or to be transmitted may include one or more of a service type, a service identifier, a service priority, an LCH identifier, an LCH priority, a data type, and a data size of the data. The attribute information of the resource may include one or more of a service type, a service identifier, a service priority, an LCH identifier, an LCH priority, a PUSCH duration, and a carriable service/LCH of the resource.

In one example, the characteristic information of the UE includes capability information of the UE. The capability information of the UE includes, for example, a capability of supporting multiple service types simultaneously, such as a capability of supporting URLLC and eMBB simultaneously, a capability of supporting multiple DRX configuration types simultaneously, a capability of maintaining a plurality of sets of DRX timers simultaneously, a capability for a corresponding HARQ process to support multiple DRX configuration types simultaneously, a capability for a corresponding HARQ process to maintain a plurality of sets of DRX timers simultaneously, a service processing capability, an energy-saving level of the UE and the like. The network node receives the UE capability information reported actively by the UE, when the UE is accessing to the network. Alternatively, the network node may obtain the capability information of the UE from the UE, for example, through a capability request indicating an intention of obtaining capability information to the UE.

At Step 101, if the UE has the capability of supporting URLLC and eMBB simultaneously and the capability of supporting multiple DRX configuration types, it may be determined that the one or more service types corresponding to the UE include a URLLC type and an eMBB type. At Step 102, a DRX parameter may be configured for each of the URLLC type and the eMBB type. Since more than one DRX parameter is configured for each of the URLLC type and the eMBB type, it can be understood here that a set of DRX parameters is configured for each of the URLLC type and the eMBB type. If it is determined based on the capability information of the UE that the UE supports only one service type, only one set of DRX parameters corresponding to the service type is configured. It should be noted that the one or more service types corresponding to the UE in this embodiment refer to one or more services to which data that can be transmitted by the UE belongs, that is, data in different application scenarios. In data transmission of the UE, data in different application scenarios may be transmitted by different LCHs.

In one example, the characteristic information of the UE includes a service type corresponding to data being transmitted or to be transmitted by the UE. The service type corresponding to the data being transmitted or to be transmitted by the UE may be actively reported to the network node by the UE, or may be detected by the network node based on data interaction of the network node with the UE, or obtained by other network nodes, such as CNC and SMF.

The attribute information of the data may reflect a service type corresponding to the data. For example, the attribute information of the data includes a data type. When the data type is a video type, the data may belong to an eMBB application scenario, that is, the service type corresponding to the data is an eMBB type. Alternatively, the attribute information of the data may include a QoS requirement of the data. For example, a service is a URLLC service if it has a high reliability and low delay requirement, otherwise it is an eMBB service. Alternatively, a service type corresponding to the data may be determined based on a service attribute indicator indicating or identifying the service type of the data. That is, the attribute information of the data includes a service type, for example, a flag bit with a value of 01 indicates a URLLC type, and the flag bit with a value of 02 indicates an eMBB type. If the flag bit of the data being transmitted or to be transmitted of the UE has a value of 01, it indicates that the service type corresponding to the data being transmitted or to be transmitted is a URLLC type.

At Step 101, multiple items of data may be being transmitted or to be transmitted by the UE. For example, one or more of the multiple items of data correspond to a URLLC type, and the other items of data correspond to an eMBB type, then it can be determined that the one or more service types corresponding to the UE include the URLLC type and the eMBB type. At Step 102, a DRX parameter may be configured for each of the URLLC type and the eMBB type. If one or more items of data being transmitted or to be transmitted correspond to a same service type, only the DRX parameter corresponding to the service type is configured.

In one example, the characteristic information of the UE includes attribute information of a resource of the UE. It is emphasized that the resource of the UE herein refers to a UL and/or DL resource of the UE. Because a resource of each UE is allocated by the network node, the network node stores the resource of the UE and attribute information of the resource, and the network node can obtain the attribute information of the resource of the UE through local query. Alternatively, the attribute information of the resource may be reported to the network node by the UE.

The attribute information of the resource may reflect a service type corresponding to the resource. The attribute information of the resource includes, for example, a service priority (a high priority indicator or a low priority indicator). At Step 101, if the attribute information of the resource contains the high priority indicator, it indicates that the UE can support the URLLC type; if the attribute information of the resource contains the low priority indicator, it indicates that the UE can support the eMBB type. Alternatively, a flag bit specially representing a service type may be added into the attribute information of the resource. In this way, the service type corresponding to the data can be identified based on the flag bit, for example, the flag bit with a value of 01 indicates a URLLC type, and the flag bit with a value of 02 indicates an eMBB type. Therefore, if the flag bit of the resource representing the service type has a value of 01, it indicates that the service type corresponding to the resource is a URLLC type. At Step 101, the network node may identify a service type corresponding to each resource based on the attribute information of each resource. If it is determined that multiple resources correspond to multiple service types, then at Step 102, a DRX parameter is configured separately for each of the multiple service types. If it is determined that multiple resources correspond to a same service type, only one set of DRX parameters corresponding to the service type is configured.

In one example, the characteristic information of the UE includes a mapping relationship between an LCH and a resource. The network node stores a mapping relationship between an LCH connected with the network node and a resource, and the mapping relationship can be determined through local query. Alternatively, information on the mapping relationship between the LCH and the resource may be reported to the network node by the UE.

At present, a mapping configuration from an LCH to a resource is introduced, so as to ensure that data of a specific LCH is guided to a specific resource for transmission, and avoid a problem that data of other LCHs occupies the specific resource, which would otherwise result in that data of the specific LCH cannot be transmitted in time. That is, if there is a mapping relationship between an LCH and a resource, it means that a corresponding service can be determined based on the characteristics of the LCH and/or the resource.

Specifically, at step 101, target information is obtained first, and then one or more service types corresponding to the UE are determined based on the target information. The target information includes at least one of: a service type corresponding to a resource in the mapping relationship, and a service type corresponding to an LCH in the mapping relationship, both of which can be obtained by the network node. Attribute information of a resource may reflect a service type corresponding to the resource, that is, the service type corresponding to the resource may be determined by the attribute information of the resource, which is similar to the above example and description thereof is omitted here. A service type corresponding to an LCH may be reflected by attribute information of the LCH, and the attribute information of the LCH may include information such as a priority of the LCH and an identifier of the LCH. For example, a priority may be at a different level. A higher priority level indicates a higher latency and/or reliability requirement, and a lower priority level indicates a lower latency and/or reliability requirement. If the priority of an LCH is at a higher level, the service type corresponding to that LCH is considered to be a URLLC type. Alternatively, a flag bit specially representing a service type may be added into attribute information of an LCH. In this way, the service type corresponding to the LCH can be identified based on the flag bit, for example, the flag bit with a value of 01 indicates a URLLC type, and the flag bit with a value of 02 indicates an eMBB type. Therefore, if the flag bit of the LCH representing the service type has a value of 01, it indicates that the service type corresponding to the LCH is a URLLC type. At Step 101, the network node identifies a service type corresponding to each resource or a service type corresponding to each LCH in the mapping relationship. If it is determined that multiple resources correspond to multiple service types or multiple LCHs correspond to multiple service types, for example, service types corresponding to resources or LCHs in the mapping relationship include a URLLC type and an eMBB type, then at Step 102, a DRX parameter is configured separately for each of the URLLC type and the eMBB type. If it is determined that multiple resources or multiple LCHs correspond to a same service type, only one set of DRX parameters corresponding to the service type is configured. Here, in a pair of a resource and an LCH in the mapping relationship, the resource and the LCH correspond to a same service type.

In a first manner, a case where a resource and an LCH have no configured or activated mapping relationship is considered. Because the service quality requirement of the data transmitted on the resource and the LCH that have no configured or activated mapping relationship may be low, a DRX parameter may not be reconfigured for the resource and the LCH. Instead, a DRX parameter corresponding to the service type having a low requirement on quality of service among the above determined service types or a DRX parameter corresponding to a specific type among the above determined service types may be configured or preconfigured for such LCH or resource. For example, the service types determined based on the target information include a URLLC type and an eMBB type. Here, because a requirement of the eMBB type on transmission timeliness is lower than a requirement of the URLLC type on transmission timeliness, the resource and the LCH described above are agreed to belong to the eMBB type, that is, the DRX parameter corresponding to the eMBB type is reused. Here, the resource and the LCH that have no configured or activated mapping relationship refer to a resource and an LCH that are not in the mapping relationship.

In a second manner, another DRX parameter may be configured or activated for the resource and LCH that have no configured or activated mapping relationship. Alternatively, the resource and LCH that have no configured or activated mapping relationship may be considered as corresponding to another service type different from the service type corresponding to a resource and an LCH that have a mapping relationship, the another service type being referred to as for example a common type. The common type is a service type that has a clear service quality requirement or has a service quality requirement different from that of the eMBB/URLLC.

Therefore, in the second manner, the determined one or more service types corresponding to the UE include at least two types, i.e., a common type, and one or more other service types that are determined. The one or more other service types that are determined refer to, for example, a URLLC type or an eMBB type. If the one or more other service types that are determined include a URLLC type and an eMBB type, the one or more service types corresponding to the UE include three types, and three sets of DRX parameters are configured accordingly.

In a third manner, a legacy DRX parameter, instead of a new DRX parameter, may be configured for the eMBB, and a new DRX parameter different from the legacy DRX parameter may be configured for the URLLC. Alternatively, a legacy DRX parameter, instead of a new DRX parameter may be configured for the URLLC, and a new DRX parameter different from the legacy DRX parameter may be configured for the eMBB.

In each of the above examples, the manner for determining the service type is specifically described in the case that the characteristic information of the UE includes one type of information. However, the manner for determining the service type is not limited to any of the examples. In other examples, the characteristic information of the UE may contain multiple types of information at the same time, and in this case, the manner for determining the service type can be set based on the actual situation.

At Step 102, different service types correspond to DRX parameters, meaning in this embodiment that the DRX parameters can be configured based on the requirements of data transmission of different service types on transmission quality. Here, the requirement on transmission quality may be understood as a QoS requirement. It should be noted that, in this embodiment, on the premise that the rule of the existing protocol itself is followed, DRX parameters may be configured for different service types by taking the requirements of data transmission of different service types on quality of service as a consideration. In other examples, different DRX parameters may also be configured based on other requirements of data of different service types, and the other requirements may be determined based on actual situations.

A DRX parameter corresponding to a service type with a higher requirement on timeliness can realize a shorter DRX period, and a DRX parameter corresponding to a service type with a lower requirement on timeliness can realize a longer DRX period. That is, the DRX periods realized by DRX parameters corresponding to different service types are different. Therefore, the UE, after receiving multiple sets of DRX parameters, can determine the UL/DL resource matched to each set of DRX parameters based on the DRX period realized by the set of DRX parameters. For example, when the UL and/or DL resource have a high requirement on delay, a high requirement on reliability or a high priority, or when the QoS requirement of an LCH that can be carried on the resource is high, or when the service corresponding to the resource is a service with a high QoS requirement, such as a URLLC service, a DRX timer corresponding to the URLLC type is maintained. When the UL and/or DL resource has a low requirement on delay, a low requirement on reliability or a low priority, or when the QoS requirement of an LCH that can be carried on the resource is low, or when the service corresponding to the resource is a service with a low QoS requirement, such as an eMBB type, a DRX timer corresponding to the eMBB type is maintained. The maintenance may include start-up, restart, stop, and the like. The DRX timer corresponding to the URLLC type refers to a DRX timer realized based on the DRX parameter corresponding to the URLLC type, and the DRX timer corresponding to the eMBB type refers to a DRX timer realized based on the DRX parameter corresponding to the eMBB type.

A set of DRX parameters comprises a DRX parameter relevant to a Hybrid Automatic Repeat reQuest (HARQ) process and a DRX parameter irrelevant to the HARQ process. In an example, different service types correspond to different DRX parameters, which can be stated as follows. For the DRX parameters relevant to the HARQ process, different service types correspond to different DRX parameters. Here, the DRX parameters relevant to the HARQ process include, for example, drx-HARQ-RTT-TimerDL, drx-HARQ-RTT-TimerUL, drx-RetransmissionTimerDL, and drx-RetransmissionTimerUL. For the DRX parameters irrelevant to the HARQ process, different DRX parameters can be configured based on the services; or certainly the DRX parameters may be unnecessary to be configured based on the service types, and instead, a set of parameter values configured based on the existing protocol is used in common. The DRX parameters irrelevant to the HARQ process include, for example, DRX-onDurationTimer and DRX-inactivity timer. In this example, UE power consumption can be greatly saved with fewer DRX parameter reconfigurations. However, the present disclosure is not limited thereto. In other examples, all DRX parameters of a set of DRX parameters may be reconfigured, or only DRX parameters irrelevant to the HARQ process may be reconfigured.

Compared with the related art, in this embodiment, the network node determines one or more service types corresponding to the UE based on characteristic information of the UE, and configures a DRX parameter for each of the one or more service types. Therefore, for each of resources corresponding to different service types, the UE may use a DRX parameter corresponding to a service type that corresponds to the resource to maintain a DRX timer for the resource. In this way, the data transmitted on each resource can meet the requirement of a corresponding service type as much as possible, that is, the requirements of data transmission in different application scenarios can be met. Furthermore, the network node may configure different DRX parameters based on the transmission quality requirements of data transmission of different service types, so that the data transmitted on each resource can meet the transmission quality requirement of a corresponding service type as much as possible under the principle that DRX can reduce power consumption of the UE, that is, the transmission quality requirements of data in different application scenarios can be met. Here, the transmission quality may be understood as a QoS requirement.

Figure 2:
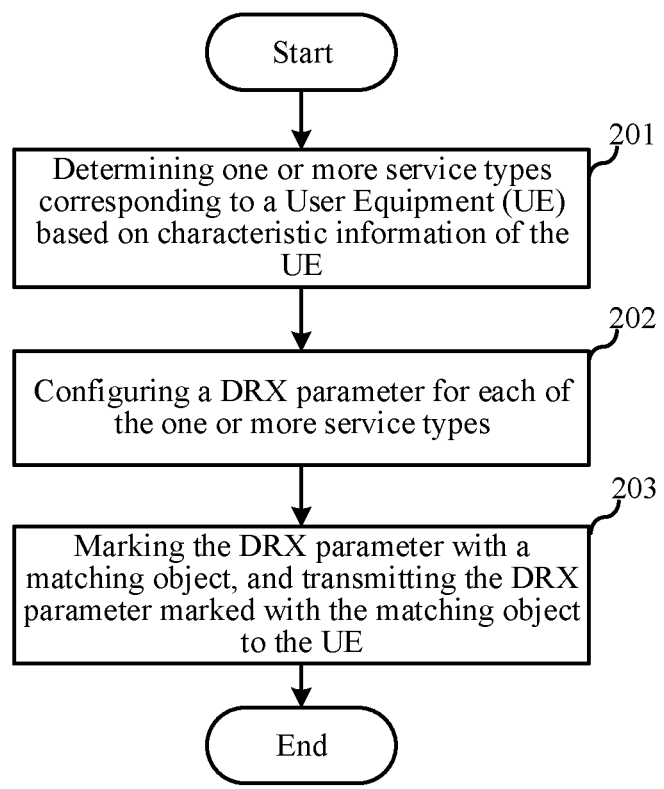
FIG. 2 is a flowchart of a DRX parameter configuration method according to a second embodiment of the present disclosure.

A second embodiment of the present disclosure relates to a DRX parameter configuration method, as shown in FIG. 2, including the following steps.

At Step 201, one or more service types of data transmitted by a User Equipment (UE) are determined based on characteristic information of the UE. Step 201 is similar to Step 101 in the first embodiment, and description thereof is omitted here.

At Step 202, a DRX parameter is configured for each of the one or more service types. Step 202 is similar to Step 102 in the first embodiment, and description thereof is omitted here.

At Step 203, the DRX parameter is marked with a matching object, and the DRX parameter marked with the matching object is transmitted to the UE. The matching object of the DRX parameter includes at least one of: the service type corresponding to the DRX parameter, a resource having attribute information reflecting the service type, and an LCH having attribute information reflecting the service type.

Specifically, the network node may mark a DRX parameter with a matching object. The matching object may include a service type corresponding to the DRX parameter. That is, it can be obtained from step 202 that, different DRX parameters correspond to different service types, and thus a DRX parameter can be marked with a service type corresponding to the DRX parameter. In addition, attribute information of a resource or an LCH reflects a service type corresponding to the resource or LCH, that is, the matching object that marks the DRX parameter may further include the resource having attribute information reflecting the service type and/or the LCH having attribute information reflecting the service type. The network node may set a plurality of attribute identifiers for a DRX parameter, including a service identifier representing the service type corresponding to the DRX parameter, a resource identifier representing the resource having attribute information reflecting the service type, and an LCH identifier representing the LCH having attribute information reflecting the service type, so as to indicate the matching object of each set of DRX parameters.

In one example, the network node may mark each set of DRX parameters with a matching object in a case where the UE corresponds to multiple service types and multiple sets of DRX parameters are set. In this way, after the multiple sets of DRX parameters marked with the matching object are transmitted to the UE, the UE can quickly identify the resource corresponding to each set of DRX parameters.

In this embodiment, when a DRX parameter is transmitted, an LCH, a resource and a service type corresponding to the DRX parameter are designated at the same time. In this way, the UE can quickly identify a corresponding DRX parameter for maintaining the DRX timer of each resource.

Figure 3:
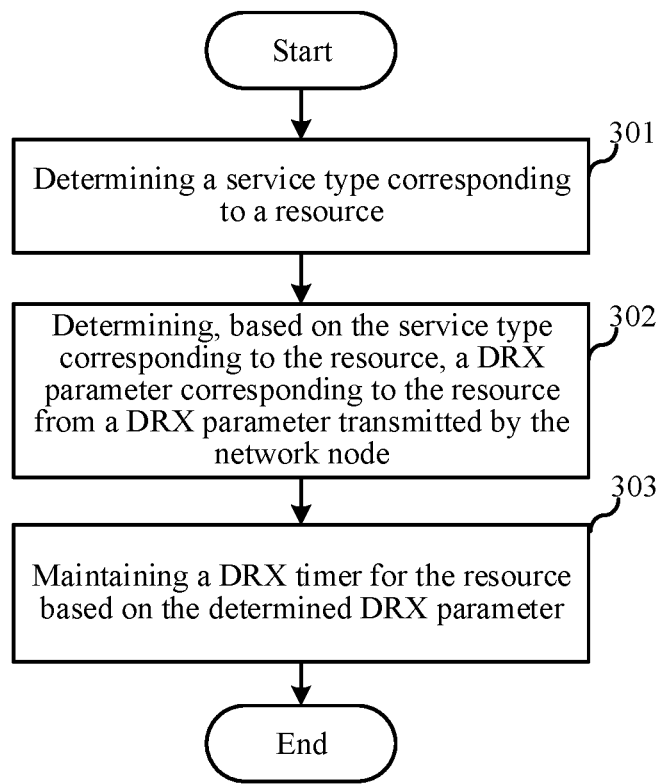
FIG. 3 is a flowchart of a DRX processing method according to a third embodiment of the present disclosure.

A third embodiment of the present disclosure relates to a DRX processing method, as illustrated in FIG. 3, including the following steps.

At Step 301, a service type corresponding to a resource is determined.

At Step 302, based on the service type corresponding to the resource, a DRX parameter corresponding to the resource is determined from a DRX parameter transmitted by a network node.

At step 303, a DRX timer is maintained for the resource based on the determined DRX parameter.

The DRX processing method in this embodiment is applied in a UE which is connected to the network node in the first or second embodiment and receives a DRX parameter transmitted by the network node. The resource in this embodiment refers to a UL and/or DL resource of the UE.

Data on an LCH is transmitted using a resource. For uploading (UL) or downloading (DL), the LCH, the data, and the resource can be understood to correspond to a same service type, That is, a service type corresponding to the data and a service type corresponding to the LCH mapped to the resource each can reflect a service type corresponding to the resource. Therefore, at Step 301, the UE may determine a service type corresponding to a resource based on at least one of: attribute information of the resource, attribute information of data transmitted using the resource, and attribute information of an LCH mapped to the resource. The specific manner for determining a service type corresponding to a resource based on attribute information of the resource, the specific manner for determining a service type corresponding to a resource based on attribute information of data transmitted using the resource, and the specific manner for determining a service type corresponding to a resource based on attribute information of an LCH mapped to the resource are the same as those of the network node in the first or second embodiment described above, and description thereof are omitted here.

In one example, if each set of DRX parameters is marked with a matching object, the UE may determine, based on the matching object, the DRX parameter that the resource need to use. For example, if the DRX parameter is marked with a resource identifier of resource A, it indicates that a DRX timer may be maintained for resource A based on the DRX parameter; if the DRX parameter is marked with a resource identifier of LCH 1 and LCH 1 is mapped to resource B, it indicates that a DRX timer can be maintained for resource B according to the DRX parameter.

At step 302, the UE may identify a length of a DRX period realized by the DRX parameter transmitted by the network node, so as to distinguish a different service type corresponding to the length of the DRX period. Generally, a service type with a high requirement on timeliness requires a relatively short DRX period, and a service type with a low requirement on timeliness can use a relatively long DRX period. If two sets of DRX parameters are received from the network node, the lengths of the DRX periods realized by the two sets of parameters can be compared with each other, and it can be determined that a set of DRX parameters with the shorter DRX period corresponds to a service type with a higher requirement on timeliness, such as a URLLC type, and a set of DRX parameters with a longer DRX period corresponds to a service type with a lower requirement on timeliness, e.g. an eMBB type. If three sets of DRX parameters are received from the network node, the lengths of DRX periods realized by the three sets of DRX parameters are identified, and the three sets of DRX parameters respectively correspond to the URLLC type, the eMBB type, and the common type according to the sequence of the realized DRX periods from short to long.

If each set of transmitted DRX parameters is marked with a matching object, the UE can also directly determine a corresponding service type based on the matching object of the set of DRX parameters.

If the UE receives two sets of DRX parameters transmitted by the network node, which correspond to the URLLC type and the eMBB type respectively, it may be one of the following cases.

In a first case, when the UE determines that a resource corresponds to a URLLC type, or data transmitted using the resource corresponds to a URLLC type, or an LCH mapped to the resource corresponds to a URLLC type, it indicates that the service type of the resource is a URLLC type. In this case, the DRX timer is maintained based on the DRX parameter corresponding to the URLLC type.

In a second case, when the UE determines that a resource corresponds to an eMBB type, or data transmitted using the resource corresponds to the eMBB type, or an LCH mapped to the resource corresponds to the eMBB type, it indicates that the service type of the resource is the eMBB type. In this case, the DRX timer is maintained based on the DRX parameter corresponding to the eMBB type.

In a third case, when the UE finds that a resource does not correspond to the URLLC type and the eMBB type and there is no LCH mapped to the resource, it considers that the service type corresponding to the resource has a low requirement on transmission timeliness and therefore the resource can be classified as belonging to the eMBB type. In this case, the DRX timer is maintained based on the DRX parameter corresponding to the eMBB type.

If the UE receives three sets of DRX parameters transmitted by the network node, corresponding to a URLLC type, an eMBB type and a common type respectively, a first and second cases are similar to the first and second cases described above where the network node transmits two sets of DRX parameters, and description thereof is omitted here. In a third case, when the UE finds that the resource does not correspond to the URLLC type and the eMBB type and there is no LCH mapped to the resource, the resource is classified as belonging to the common type, and therefore the DRX timer is maintained based on the DRX parameter corresponding to the common type.

It should be noted that, in this embodiment, the category of the service type is not limited at all, and may be determined based on data that needs to be transmitted in an actual application scenario.

In one example, if the UE receives DRX parameters corresponding to multiple service types from the network node, only the DRX parameter relevant to a HARQ process is reconfigured based on the requirement of its corresponding service type on quality of service. In this case, when detecting that a HARQ process exists, the UE may detect a resource corresponding to the HARQ process, so as to determine a service type corresponding to the resource corresponding to the HARQ process. For other resources, the DRX timer can be maintained based on the DRX parameter corresponding to the common type.

For example, the network node configures, for the UE, DRX parameters corresponding to a URLLC type and an eMBB type respectively. If the LCH configured for CG resource 1 is a URLLC-type LCH, and the corresponding HARQ process is HARQ process 1, when the UE uses the CG resource 1 to transmit the MAC PDU, the UE starts drx-HARQ-RTT-TimerUL-URLLC corresponding to URLLC at a first symbol following the end of PUSCH transmission and stops drx-RetransmissionTimerUL-URLLC. When the drx-HARQ-RTT-TimerUL-URLLC expires, the UE starts drx-RetransmissionTimerUL-URLLC at a first symbol after the expiration of the drx-HARQ-RTT-TimerUL-URLLC.

For another example, the network node configures, for the UE, DRX parameters corresponding to a URLLC type and an eMBB type respectively. If the LCH configured for CG resource 2 or DG is an eMBB-type LCH, and the corresponding HARQ process is HARQ process 3, when the UE uses the CG/DG resource to transmit the MAC PDU, the UE starts drx-HARQ-RTT-TimerUL-eMBB corresponding to the URLLC at a first symbol following the end of PUSCH transmission, and stops drx-RetransmissionTimerUL-eMBB. When the drx-HARQ-RTT-TimerUL-eMBB expires, the UE starts the drx-RetransmissionTimerUL-eMBB at a first symbol after the expiration of drx-HARQ-RTT-TimerUL-eMBB.

For another example, the network node configures, for the UE, DRX parameters corresponding to a URLLC type and an eMBB type respectively. If the LCH mapped to CG resource 2 or DG is not configured for the CG resource 2 or DG, and the corresponding HARQ process is HARQ process 5, when the UE transmits the MAC PDU using the CG/DG resource, the UE starts drx-HARQ-RTT-TimerUL-eMBB corresponding to the URLLC type at a first symbol following the end of PUSCH transmission, and stops drx-RetransmissionTimerUL-eMBB. When the drx-HARQ-RTT-TimerUL-eMBB expires, the UE starts drx-RetransmissionTimerUL-eMBB at a first symbol after the expiration of the drx-HARQ-RTT-TimerUL-eMBB.

Whether a retransmission timer is started when downlink drx-HARQ-RTT-TimerDL-eMBB or downlink drx-HARQ-RTT-TimerDL-URLLC expires depends on an additional condition. That is, the retransmission timer is started if data of the corresponding HARQ process is not successfully received.

In this embodiment, the network node determines one or more service types corresponding to the UE based on characteristic information of the UE, and configures a DRX parameter for each of the one or more service types. Therefore, for each of resources corresponding to different service types, the UE may maintain a DRX timer for the resource using a DRX parameter corresponding to a service type that corresponds to the resource, and thus the data transmitted on the resource can meet the requirement of the service type as much as possible. Furthermore, the network node may configure different DRX parameters based on the transmission quality requirements of data transmission of different service types, so that the data transmitted on each resource can meet the transmission quality requirement of the corresponding service type as much as possible under the principle that DRX can reduce power consumption of the UE, that is, the transmission quality requirements of data in different application scenarios can be met. Here the transmission quality may be understood as a QoS requirement.

It should be understood that, this embodiment corresponds to the first or second embodiment, and this embodiment can be implemented in cooperation with the first embodiment. The related technical details mentioned in the first embodiment can apply to this embodiment, and are omitted here so as to avoid a repetitive description. Accordingly, the related technical details mentioned in this embodiment can apply to the first embodiment.

A fourth embodiment of the present disclosure relates to a network node. The network node includes at least one processor 401 and a memory 402 communicatively connected to the at least one processor 401. The memory 402 stores instructions executable by the at least one processor 401. The instructions, when executed by the at least one processor 401, enable the at least one processor 401 to perform the DRX parameter configuration method according to the first embodiment or second embodiment.

The memory 402 and the processor 401 are connected by a bus architecture. The bus architecture may include any number of interconnected buses and bridges, and couple various circuits of the at least one processor 401 and the memory 402 together. The bus architecture may also connect various other circuits such as peripherals, voltage regulators, power management circuits, etc. These are well known in the art, and a further description thereof will therefore be omitted herein. A bus interface provides an interface between the bus and a transceiver. The transceiver may be in the form of one element or a plurality of elements, such as a plurality of receivers and transmitters, and may provide a unit for communicating with various other apparatuses over a transmission medium. Data processed by the processor 401 may be transmitted over a wireless medium through an antenna, and the antenna may also receive data and transmit the data to the processor 401.

The processor 401 may be configured to manage the bus and general processing, and may also provide various functions including timing, peripheral interfacing, voltage regulation, power management, and other control functions. The memory 402 may be configured to store data used by the processor 401 in performing operations.

It should be understood that, this embodiment is an apparatus embodiment corresponding to the first or second embodiment, and this embodiment can be implemented in cooperation with the first or second embodiment. The related technical details mentioned in the first or second embodiment can apply to this embodiment, and are omitted here so as to avoid a repetitive description. Accordingly, the related technical details mentioned in this embodiment can apply to the first or second embodiment.

A fifth embodiment of the present disclosure relates to a user equipment. The user equipment includes at least one processor and a memory communicatively connected to the at least one processor. The memory stores instructions executable by the at least one processor. The instructions, when executed by the at least one processor, enable the at least one processor to perform the DRX processing method according to the third embodiment.

Figure 4:
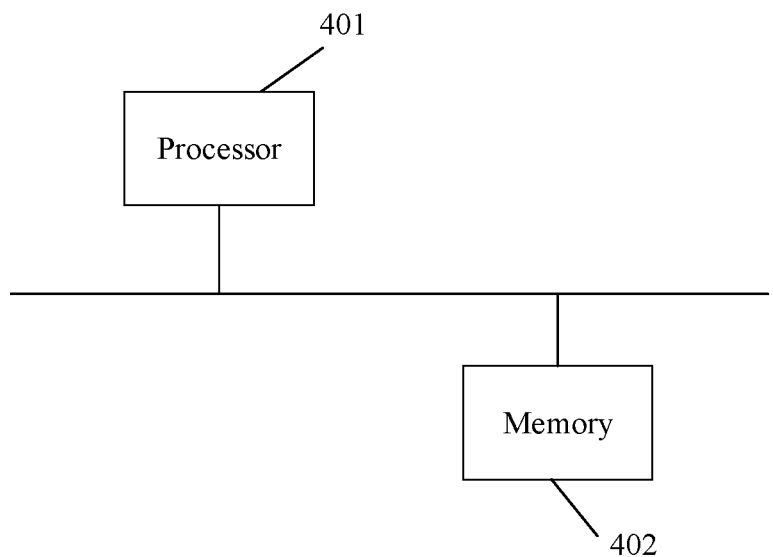
FIG. 4 is a block diagram of a network node according to a fourth embodiment of the present disclosure.

Regarding the connection of the at least one processor with the memory in the user equipment in this embodiment, reference may be made to FIG. 4.

It should be understood that, this embodiment is an apparatus embodiment corresponding to the third embodiment, and this embodiment can be implemented in cooperation with the third embodiment. The related technical details mentioned in the third embodiment can apply to this embodiment, and are omitted here so as to avoid a repetitive description. Accordingly, the related technical details mentioned in this embodiment can apply to the third embodiment.

A sixth embodiment of the present disclosure relates to a non-transitory computer-readable storage medium having a computer program stored thereon. The computer program, when executed by a processor, implements the method in any of the above-described embodiments.

It will be understood by those of ordinary skill in the art that, any of the foregoing embodiments is a specific example implementing the present disclosure and in the practical application, various changes in the form and details may be made to any of the foregoing embodiments without departing from the spirit and scope of the present disclosure.

What is claimed is:

1. A Discontinuous Reception (DRX) parameter configuration method, applied in a network node, the DRX parameter configuration method comprising:
   determining one or more service types corresponding to a User Equipment (UE) based on characteristic information of the UE;
   configuring a DRX parameter for each of the one or more service types; and
   transmitting the DRX parameter to the UE;
   wherein the characteristic information of the UE comprises a mapping relationship between a Logical Channel (LCH) of the UE and a resource of the UE;

wherein said determining the one or more service types corresponding to the UE based on the characteristic information of the UE comprises:

determining the one or more service types corresponding to the UE based on obtained target information, the target information comprising at least one of: attribute information of the resource in the mapping relationship and attribute information of the LCH in the mapping relationship.

2. The DRX parameter configuration method according to claim 1, wherein said determining the one or more service types corresponding to the UE based on the characteristic information of the UE further comprises:

mapping a resource and an LCH of the UE, which are not in the mapping relationship, to another service type different from the service type reflected by the attribute information of the resource and the attribute information of the LCH in the mapping relationship, the one or more service types corresponding to the UE comprising the another service type.

3. The DRX parameter configuration method according to claim 1, wherein said transmitting the DRX parameter to the UE comprises:

marking the DRX parameter with a matching object, and transmitting the DRX parameter marked with the matching object to the UE, the matching object of the DRX parameter comprising at least one of: the service type corresponding to the DRX parameter, a resource having attribute information reflecting the service type, and an LCH having attribute information reflecting the service type.

4. The DRX parameter configuration method according to claim 1, wherein the DRX parameter comprises a DRX parameter related to a Hybrid Automatic Repeat reQuest (HARM) process.

5. The DRX parameter configuration method according to claim 1, wherein the one or more service types comprise one or more of: a Ultra Reliable Low Latency Communications (URLLC) type, an Enhanced Mobile Broadband (eMBB) type, and a common type;

wherein the common type has a lower requirement on quality of service than the eMBB type.

6. A network node, comprising:

at least one processor; and a memory communicatively connected to the at least one processor, wherein the memory stores instructions executable by the at least one processor, the instructions, when executed by the at least one processor, enable the at least one processor to:

determine one or more service types corresponding to a User Equipment (UE) based on characteristic information of the UE;

configure a DRX parameter for each of the one or more service types; and transmit the DRX parameter to the UE;

wherein the characteristic information of the UE comprises a mapping relationship between a Logical Channel (LCH) of the UE and a resource of the UE;

wherein the at least one processor determining the one or more service types corresponding to the UE based on the characteristic information of the UE comprises:

the at least one processor determining the one or more service types corresponding to the UE based on obtained target information, the target information comprising at least one of: attribute information of the resource in the mapping relationship and attribute information of the LCH in the mapping relationship.

7. The network node according to claim 6, wherein said determining the one or more service types corresponding to the UE based on the characteristic information of the UE further comprises:

mapping a resource and an LCH of the UE, which are not in the mapping relationship, to another service type different from the service type reflected by the attribute information of the resource and the attribute information of the LCH in the mapping relationship, the one or more service types corresponding to the UE comprising the another service type.

8. The network node according to claim 6, wherein said transmitting the DRX parameter to the UE comprises:

marking the DRX parameter with a matching object, and transmitting the DRX parameter marked with the matching object to the UE, the matching object of the DRX parameter comprising at least one of: the service type corresponding to the DRX parameter, a resource having attribute information reflecting the service type, and an LCH having attribute information reflecting the service type.

9. The network node according to claim 6, wherein the DRX parameter comprises a DRX parameter related to a Hybrid Automatic Repeat reQuest (HARM) process.

10. The network node according to claim 6, wherein the one or more service types comprise one or more of: a Ultra Reliable Low Latency Communications (URLLC) type, an Enhanced Mobile Broadband (eMBB) type, and a common type;

wherein the common type has a lower requirement on quality of service than the eMBB type.

11. A DRX processing method, applied in a User Equipment (UE) connected to a network node, the network node being the network node in the DRX parameter configuring method according to claim 1, the DRX processing method comprising:

determining a service type corresponding to a resource;

determining, based on the service type corresponding to the resource, a DRX parameter corresponding to the resource from a DRX parameter transmitted by the network node; and maintaining a DRX timer for the resource based on the determined DRX parameter;

wherein said determining the service type corresponding to the resource comprises:

determining the service type corresponding to the resource based on at least one of attribute information of the resource, attribute information of data transmitted using the resource, or attribute information of a Logical Channel (LCH) mapped to the resource; wherein the resource is a resource in a mapping relationship between a LCH of the UE and a resource of the UE, and the LCH mapped to the resource is a LCH mapped to the resource according to the mapping relationship.

12. A user equipment, comprising:

at least one processor; and a memory communicatively connected to the at least one processor, wherein the memory stores instructions executable by the at least one processor, the instructions, when executed by the at least one processor, enable the at least one processor to perform the DRX processing method according to claim 11.

13. A non-transitory computer-readable storage medium, having a computer program stored thereon, wherein the computer program, when executed by a processor, implements the DRX parameter configuration method according to claim 1.

14. A non-transitory computer-readable storage medium, having a computer program stored thereon, wherein the computer program, when executed by a processor, implements the DRX processing method according to claim 11.

* * * * *